US011531091B2

(12) United States Patent
Spiessberger et al.

(10) Patent No.: US 11,531,091 B2
(45) Date of Patent: Dec. 20, 2022

(54) LIDAR DEVICE INCLUDING A DYNAMIC FILTER, AND METHOD

(71) Applicant: Robert Bosch GmbH, Stuttgart (DE)

(72) Inventors: Stefan Spiessberger, Weinstadt (DE); Annemarie Holleczek, Stuttgart (DE); Nico Heussner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 632 days.

(21) Appl. No.: 16/499,918

(22) PCT Filed: Mar. 27, 2018

(86) PCT No.: PCT/EP2018/057777
§ 371 (c)(1),
(2) Date: Oct. 1, 2019

(87) PCT Pub. No.: WO2018/184915
PCT Pub. Date: Oct. 11, 2018

(65) Prior Publication Data
US 2020/0116831 A1 Apr. 16, 2020

(30) Foreign Application Priority Data
Apr. 4, 2017 (DE) .................. 102017205685.1

(51) Int. Cl.
*G01S 7/481* (2006.01)
*H01Q 3/14* (2006.01)
(52) U.S. Cl.
CPC .......... *G01S 7/4816* (2013.01); *G01S 7/481* (2013.01); *H01Q 3/14* (2013.01)

(58) Field of Classification Search
CPC .......... G01S 7/4816; G01S 7/481; H01Q 3/14
See application file for complete search history.

(56) References Cited

U.S. PATENT DOCUMENTS

2008/0285010 A1  11/2008  Shoji et al.
2014/0125990 A1* 5/2014  Hinderling .......... G01B 11/002
                                                 356/496
(Continued)

FOREIGN PATENT DOCUMENTS

DE    102009023066 A1   10/2010
DE    202012010014 U1    1/2014
(Continued)

OTHER PUBLICATIONS

International Search Report for PCT/EP2018/057777, dated Jun. 11, 2018.

*Primary Examiner* — Jamil Ahmed
(74) *Attorney, Agent, or Firm* — Norton Rose Fulbright US LLP; Gerard Messina

(57) ABSTRACT

A LIDAR device for scanning a scanning angle, including at least one radiation source for generating at least one electromagnetic beam, including a rotatable mirror for deflecting the at least one electromagnetic beam along the scanning angle, including a receiving unit for receiving at least one incoming electromagnetic beam and for deflecting the at least one incoming electromagnetic beam to at least one detector, and including at least one filter, the at least one filter being adaptable to the at least one incoming electromagnetic beam. Moreover, a method for scanning a scanning angle with the aid of such a LIDAR device is described.

11 Claims, 5 Drawing Sheets

(56) References Cited

U.S. PATENT DOCUMENTS

| | | | |
|---|---|---|---|
| 2014/0240721 A1 | 8/2014 | Herschbach | |
| 2016/0084945 A1* | 3/2016 | Rodrigo et al. | |
| 2017/0199273 A1* | 7/2017 | Morikawa | G01S 7/497 |
| 2018/0081045 A1* | 3/2018 | Gylys | G01S 7/487 |

FOREIGN PATENT DOCUMENTS

| | | | | |
|---|---|---|---|---|
| EP | 2551635 A1 | | 1/2013 | |
| EP | 3067713 A1 | | 9/2016 | |
| JP | H02223815 A | | 9/1990 | |
| JP | 2004514945 A | | 5/2004 | |
| JP | 2007085832 A | | 4/2007 | |
| JP | 2009076557 A | | 4/2009 | |
| JP | 2012242134 A | | 12/2012 | |
| JP | 2013019790 A | | 1/2013 | |
| JP | 2013148446 A | | 8/2013 | |
| JP | 2016530503 A | | 9/2016 | |
| JP | 2016217971 A | * | 12/2016 | G01S 7/481 |
| JP | 2016217971 A | | 12/2016 | |

* cited by examiner

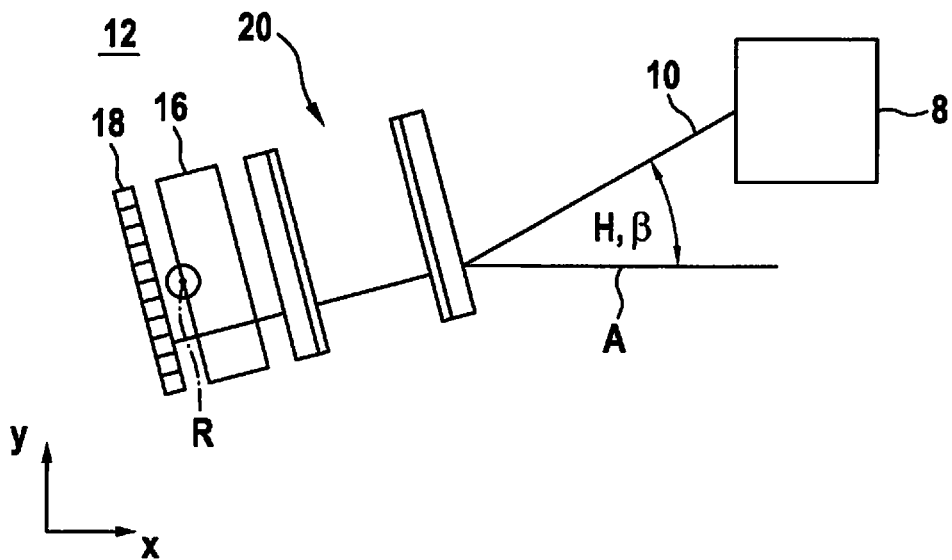
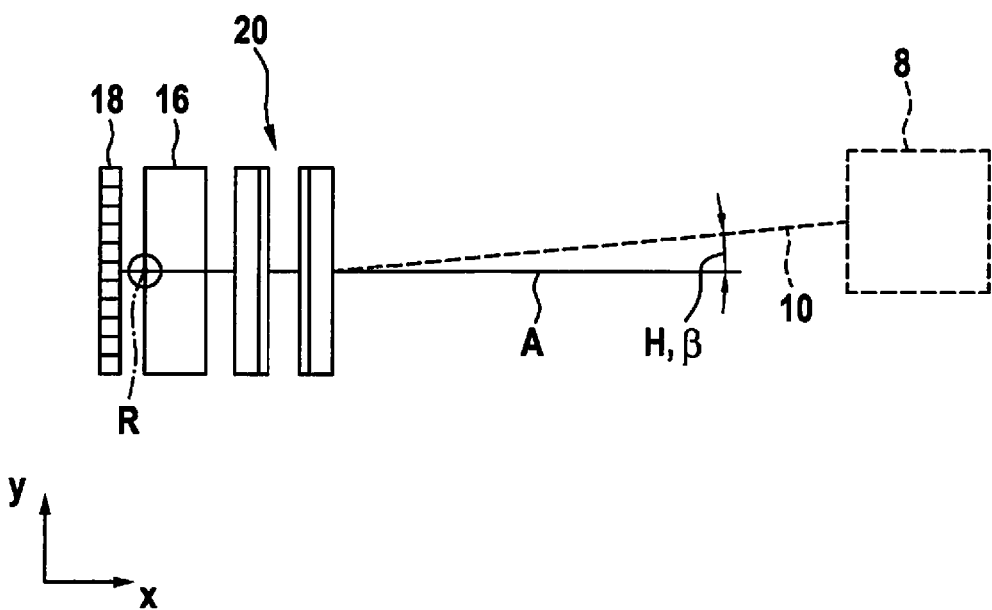

LIDAR DEVICE INCLUDING A DYNAMIC FILTER, AND METHOD

FIELD OF THE INVENTION

The present invention relates to a LIDAR device for scanning a scanning angle as well as to a method for scanning a scanning angle with the aid of a LIDAR device.

BACKGROUND INFORMATION

Typical LIDAR (Light Detection and Ranging) devices are made up of a transceiver unit. The transmitting unit generates and emits electromagnetic radiation continuously or in a pulsed manner. If this electromagnetic radiation impacts a movable or stationary object, the electromagnetic radiation is reflected by the object in the direction of the receiving unit. The receiving unit may detect the reflected electromagnetic radiation and assign a received time thereto. This may be utilized within the scope of a "time-of-flight" analysis for an ascertainment of a distance of the object to the LIDAR device. Depending on the area of application, high requirements are placed on the signal quality. This is the case, in particular, when the LIDAR device may have a high range and, simultaneously, a wide scanning angle. The signal quality determines, inter alia, up to which distance, at which angle, and at what degree of accuracy or likelihood objects may be detected. This signal quality results largely from the quality of the optical filtering of the received reflected radiation. The width of the spectral bandpass of a filter, which may be utilized, is decisive therefor. The narrower the spectral bandwidth of the filter is, the less stray or ambient light falls onto the detector and the better the signal quality is. Since this passband is shifted toward smaller wavelengths as the incidence angle of the received radiation increases, the filter must have a certain width in order to still be able to transmit the received radiation even at great angles. Presently, the shifting of the transmission window of the filter, which is dependent on the incidence angle, is a physical limit of LIDAR devices.

SUMMARY OF THE INVENTION

The object underlying the present invention may be considered that of creating a method and a LIDAR device, which includes at least one filter, which always has optimal transmission characteristics despite a varying incidence angle of an incoming beam.

This object may be achieved with the aid of the particular subject matter of the independent claims. Advantageous embodiments of the present invention are the subject matter of particular dependent subclaims.

According to one aspect of the present invention, a LIDAR device for scanning a scanning angle is provided. The LIDAR device includes at least one radiation source for generating at least one electromagnetic beam, and a rotatable mirror for deflecting the at least one electromagnetic beam along the scanning angle. Moreover, the LIDAR device includes a receiving unit for receiving at least one incoming electromagnetic beam and for deflecting the at least one incoming electromagnetic beam to at least one detector, and at least one filter, the at least one filter being adaptable to the at least one incoming electromagnetic beam.

Such a LIDAR device includes a dynamic optical filter, which may compensate for an incidence angle-dependent wavelength shift of an incoming beam. In the case of greater incidence angles in particular, a transmission range of the filter for a certain wavelength range may shift toward smaller wavelengths. The filter may be adapted in order to prevent the situation in which an incoming electromagnetic beam, in the case of a greater incidence angle, may pass through the filter only in a limited way or not at all. This may be implemented, for example, by adapting a position of the filter or by adapting at least one material property of the filter. As a result, the transmission range of the filter may be dynamically or statically adapted or adjusted. Alternatively or additionally, the entire receiving unit may be adaptable. The filter may be, for example, a dielectric filter having one or multiple defined transmission ranges. The transmission ranges relate to a wavelength or a frequency of an electromagnetic beam in this case. The electromagnetic beam may be, for example, a laser beam or a light beam in the visible or the invisible wavelength range.

According to one exemplary embodiment of the LIDAR device, the at least one filter is rotatable along the scanning angle. As a result, the filter is rotatably or turnably mounted, so that its orientation may be changed. In particular, with the aid of this measure, the incidence angle of an incoming beam in relation to the filter may be optimally set. Therefore, the wavelength of the incoming beam may always be located in at least one transmission range of the filter and pass through the filter in what may be a low-loss manner. An optimal incidence angle is ideally 0°. The incidence angle may also deviate from 0°, however, depending on a transmission characteristic of the filter and the wavelength shift of the incoming beam. The change of the orientation of the filter may take place, for example, with the aid of piezoelectric actuators, electrostatic motors, electromagnetic motors, or the like.

According to a further exemplary embodiment of the LIDAR device, the at least one filter is angular-offset or angular-synchronous rotatable in relation to the rotatable mirror. The orientation of the filter may be adjusted or adapted depending on the mirror. Depending on the requirement profile and configuration of the LIDAR device, the filter may also be rotated or swiveled independently of the mirror in order to deflect the generated electromagnetic beam. In this case, the filter may be adapted, for example, in a time-dependent manner, so that an angular offset between the filter and the mirror may also be implemented. Alternatively or additionally, the entire receiving unit or parts of the receiving unit may be rotatable or swivelable in parallel to the filter.

According to a further exemplary embodiment, the at least one filter is a Fabry-Pérot cavity. The filter may be a conventional optical filter or an optical resonator. The Fabry-Pérot cavity corresponds to an optical resonator, which is made up of at least two semi-reflecting mirrors. Depending on a spacing or a cavity length of the two semi-reflecting mirrors with respect to one another, only incoming electromagnetic radiation having a certain wavelength may pass. The semi-reflecting mirrors may have low reflectivity in order to increase a decoupling efficiency for greater incidence angles.

According to a further exemplary embodiment of the LIDAR device, the at least one filter has an adjustable cavity length. The spacing of the two semi-reflecting mirrors may be changed, so that the transmission wavelength of the Fabry-Pérot cavity may be adapted. For example, one or both semi-reflecting mirrors may be adjusted with the aid of piezoelectric actuators or electrostatic or electromagnetic linear actuators. By way of the adjustment of the semi-reflecting mirrors, the cavity length may be changed or adapted and, therefore, the transmission range may also be changed or adapted.

According to a further exemplary embodiment, the cavity length is adjustable depending on an orientation of the rotatable mirror. In this case, the cavity length of the Fabry-Pérot cavity may be reduced or enlarged according to the deflection of the mirror, in order to deflect the generated beam. The reflected electromagnetic beam has a similar incidence angle as the orientation of the mirror. As a result, the transmission range may be adapted to the incidence angle. In this way, it may be ensured that the incoming beam may always pass through the filter.

According to a further exemplary embodiment, the at least one filter has an adjustable refractive index. A change of the refractive index or the refractive indices may take place, for example, with the aid of a dynamic alignment of liquid crystals using electric or magnetic fields. Since the transmission range of the filter may be dependent on its temperature, in addition to the wavelength shift of the incoming beam, this effect may be utilized for adjusting the transmission range or the refractive index. In particular, the refractive index is dependent on a density of the material and, therefore, is also dependent on the temperature. Therefore, the refractive index may also be adjusted with the aid of a temperature of the filter or a portion of the filter. For example, in the case of a Fabry-Pérot cavity, the semi-reflecting mirrors are applied or vapor-coated on a glass or a transparent substrate. This substrate may undergo a change of the refractive index by being acted upon by temperature and/or electric fields or magnetic fields. In the case of a regular filter, the refractive index may also have an effect on the transmission range. Therefore, the filter or at least a portion of the filter may be cooled or heated in order to compensate for undesirable effects or in order to adapt the filter. The temperature may be lowered, for example, with the aid of air or water cooling. The filter may also be heated with the aid of heated water or heated air. Alternatively, the heating of the filter may take place with the aid of an electrically conductive layer or coating. In this way, one or multiple glass elements of the filter may be heated with the aid of Joule heating.

According to a further exemplary embodiment of the LIDAR device, the refractive index is adjustable depending on the orientation of the rotatable mirror. Advantageously, the refractive index is adjusted in such a way that the transmission range of the filter is adapted to the wavelength shift or to the incidence angle of the incoming beam. As a result, the refractive index of the filter or a portion of a filter, such as glass, may be adjusted with respect to the transmission range in such a way that the incoming beam may pass through the filter in what may be a complete and low-loss manner.

According to a further exemplary embodiment, at least two filters for filtering the at least one incoming electromagnetic beam are situatable with an angular offset with respect to one another. As an alternative or in addition to the described examples, a plurality of filters may be utilized, which are situated at an angle with respect to one another. As a result, each filter may respond less dynamically to an incoming beam, since the incidence angle may no longer be as great as is the case for a single static filter. Therefore, the incidence angle of the incoming beam in relation to a filter is increasingly reduced by an increasing number of static or dynamic filters, which are set up, for example, in a semi-circle. As a result, each filter may be adaptable or changeable depending or not depending on the incidence angle or at least one adjacent filter. Alternatively or additionally, all or some of the filters may be regular optical filters, which have no dynamic adaptation.

According to a further exemplary embodiment, the at least one filter for filtering the at least one incoming electromagnetic beam has a curvature. Advantageously, a filter may be utilized, which has a curvature, which covers a scanning angle of the LIDAR device, at least in some areas, and therefore covers an angular range, within which an incoming reflected beam may impact the filter. The filter may be oriented in such a way that the incoming beam always impacts the filter perpendicularly, regardless of the incidence angle of the incoming beam. As a result, the filter may additionally have a dynamic adaptation of the refractive index, for example, with the aid of a temperature change. Such a filter may alternatively have a curvature, which has a varying radius of curvature. As a result, it may be advantageous to move the filter along at least one length in order to adapt the filter to an incoming beam.

According to a further aspect of the present invention, a method for scanning a scanning angle with the aid of a LIDAR device is provided. In one step, at least one electromagnetic beam is generated and is deflected along the scanning angle. The at least one deflected electromagnetic beam may be reflected on an object positioned in a scanning angle. The at least one reflected electromagnetic beam becomes at least one incoming beam and is received and filtered. Thereafter, the at least one incoming beam is detected, at least one filter being adapted according to a wavelength and/or an incidence angle of the at least one incoming beam. As a result, the filter may be dynamically changed. In particular, the filter may be adapted to a wavelength of the incoming beam depending on an incidence angle of the incoming beam. In this way, it is possible to displace or rotate the filter in such a way that an incoming beam impacts the filter at what may be a small incidence angle in relation to the filter. Alternatively or additionally, material properties of the filter may be adapted. In the case of an optical resonator as the filter, a cavity length may be dynamically varied in order to be able to provide a transmission range adapted to the wavelength of the incoming beam. The adaptation may take place continuously according to a scanning rate of the method.

Exemplary embodiments of the present invention are explained in greater detail in the following with reference to highly simplified schematic representations.

In the figures, the same structural elements each have the same reference numerals.

BRIEF DESCRIPTION OF THE DRAWINGS

FIGS. 5*a* and 5*b* show a schematic representation of the receiving unit of the LIDAR device according to a fourth exemplary embodiment.

DETAILED DESCRIPTION

Figure 1:
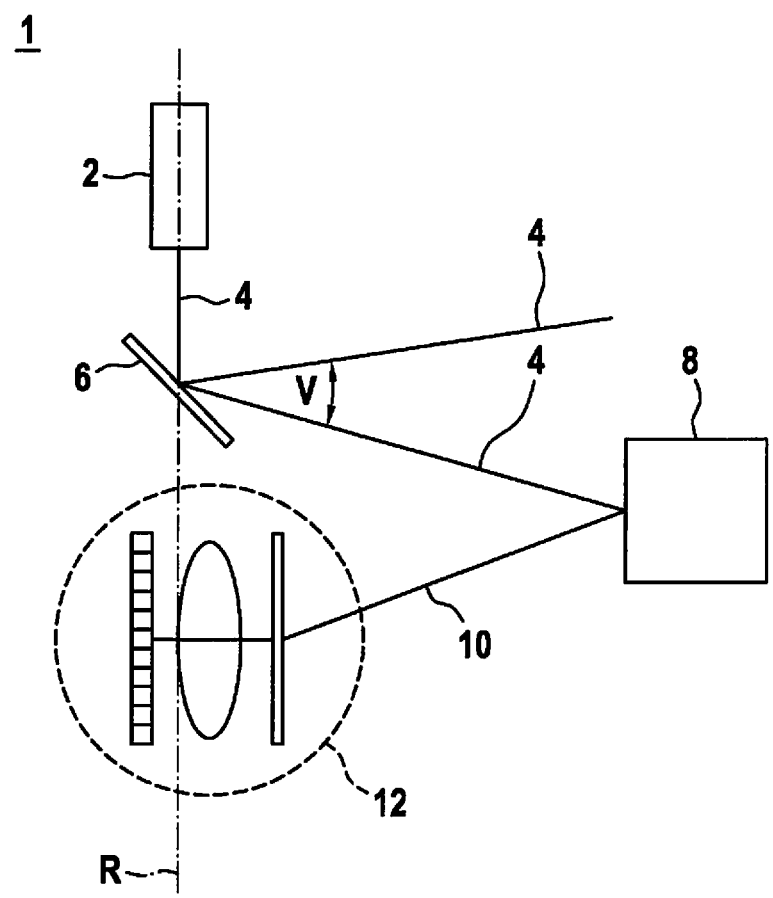
FIG. 1 shows a schematic representation of a LIDAR device according to a first exemplary embodiment.

FIG. 1 shows a first exemplary embodiment of a LIDAR device 1. LIDAR device 1 includes a radiation source 2 for generating an electromagnetic beam 4. According to the exemplary embodiment, radiation source 2 is a laser 2. According to the exemplary embodiment, laser 2 is utilized for generating a beam 4 having a wavelength in the non-visible infrared range. The wavelength may be, for example, greater than 800 nm. Beam 4 generated by laser 2 is deflected by a rotatable mirror 6. Mirror 6 is swivelable along a rotational axis R. Therefore, mirror 6 may deflect generated beam 4 along a defined horizontal scanning angle H. Additionally, mirror 6 is swivelable orthogonally with respect to horizontal scanning angle H and therefore covers a vertical scanning angle V. As a result, LIDAR device 1 may scan a solid angle V×H and possibly locate objects 8 positioned in this solid angle V×H. Generated beam 4 is at least partially reflected by object 8 and becomes reflected or incoming beam 10. Incoming beam 10 is received by a receiving unit 12.

Figure 2:
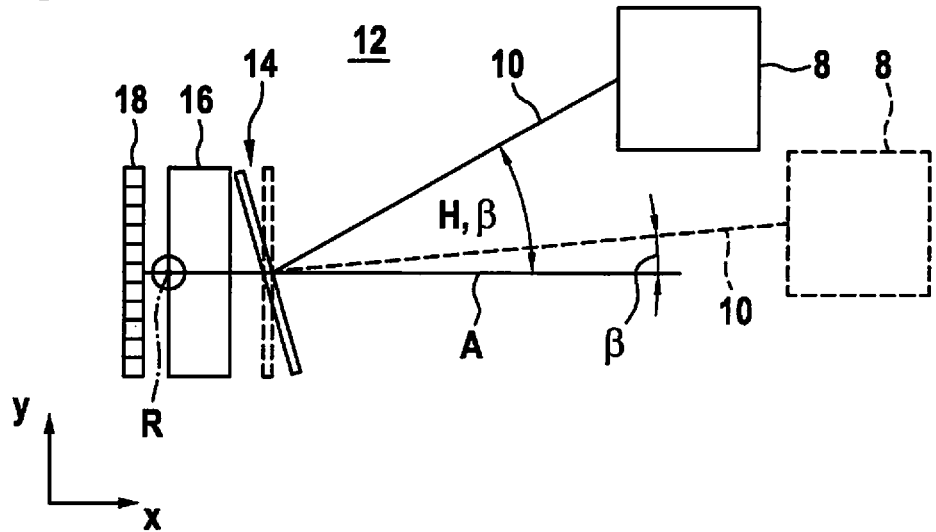
FIG. 2 shows a schematic representation of a receiving unit of the LIDAR device according to the first exemplary embodiment.

In FIG. 2, a schematic representation of receiving unit 12 of LIDAR device 1 according to the first exemplary embodiment is represented. Objects 8 are also shown, in the alternative, in order to clarify the exemplary embodiments. Receiving unit 12 is shown in an x-y plane. Rotational axis R extends orthogonally through the x-y plane. Receiving unit 12 includes a filter 14, which may allow incoming beam 10 to pass and blocks stray light or stray reflections. Since a transmission range of such filters 14 shifts toward smaller wavelengths as the incidence angle increases, either the transmission range must be large or possible incidence angles β, must be small. Incidence angle β, includes a component of a horizontal scanning angle H as well as a component of a vertical scanning angle V. The component may also be 0°. According to the exemplary embodiment, filter 14 is rotatably mounted and is rotated synchronously with mirror 6 with the aid of a piezoelectric actuator (not shown) or is periodically swiveled along a rotational axis, which extends in parallel to rotational axis R. As a result, a large horizontal scanning angle H may be scanned. In particular, filter 14 is adjusted in such a way that an incoming beam 10 may impact filter 14 perpendicularly. As a result, a narrow transmission range of filter 14 may be selected, since an angle-dependent wavelength change of incoming beam 10 is not present or is only slightly present. Filter 14 shown with the aid of dashed lines does not have an adaptation of its angle when an object 8 is situated frontally or slightly offset with respect to an optical axis A. In the case of an object 8 located farther from optical axis A, an incoming beam 10 has a greater incidence angle β. Since filter 14 is swiveled synchronously with mirror 6, incidence angle β in relation to optical axis A is great, for example, greater than 20°, but incidence angle β in relation to adjusted filter 14 is 0°. Incoming beam 10 may therefore transmit through filter 14 and enter an optical receiving system 16. Optical receiving system 16 directs incoming beam 10 onto a detector 18. Detector 18 registers incoming beam 10 and provides incoming beam 10, for example, with a received time and a scanning angle H, V of mirror 6.

Figure 3:
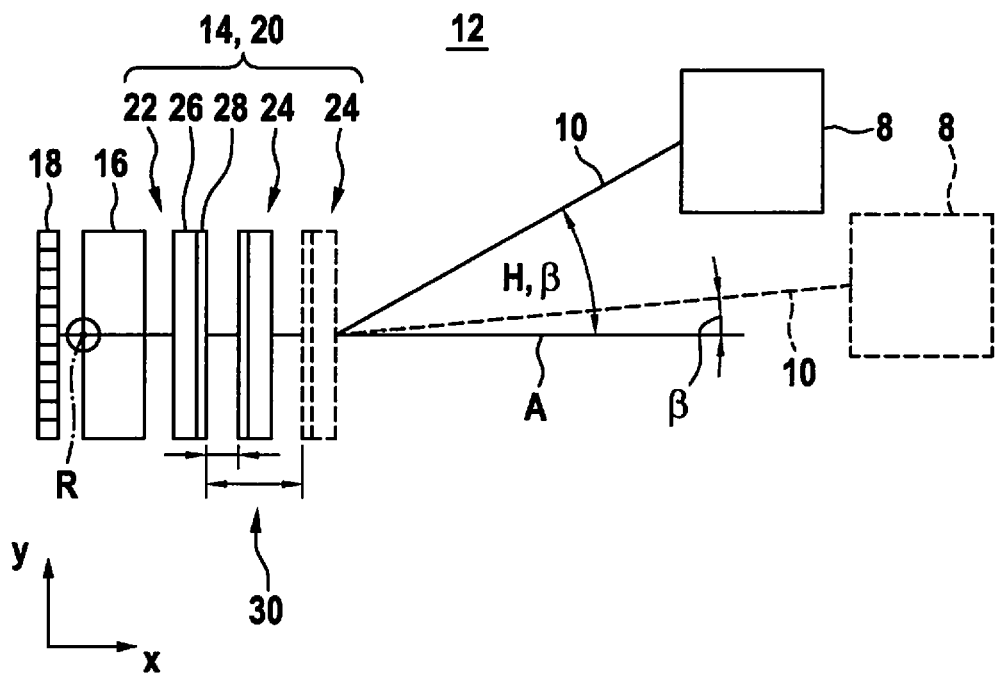
FIG. 3 shows a schematic representation of the receiving unit of the LIDAR device according to a second exemplary embodiment.

FIG. 3 shows a schematic representation of receiving unit 12 of LIDAR device 1 according to a second exemplary embodiment. In contrast to the first exemplary embodiment, receiving unit 12 includes an adaptable filter 14, which is made up of a Fabry-Pérot cavity 20. Fabry-Pérot cavity 20 includes two semi-reflecting mirrors 22, 24. Each of the semi-reflecting mirrors 22, 24 is made up of a glass substrate 26 and a semi-reflecting coating 28. A first semi-reflecting mirror 22 is stationary in this case and may not be displaced. A second semi-reflecting mirror 24 is situated so as to be displaceable with the aid of an actuator (not shown). Therefore, with the aid of a displacement of second semi-reflecting mirror 24, a cavity length 30 or the distance between the two semi-reflecting mirrors 22, 24 may be changed. Incoming beams 10 may pass through Fabry-Pérot cavity 20 when they have a certain wavelength in relation to cavity length 30. Consequently, a transmission range for incoming beams 10 having a certain wavelength may be generated with the aid of an adjustment of cavity length 30. Cavity length 30 must be reduced, for example, so that incoming beams 10 having a smaller wavelength may be able to pass through Fabry-Pérot cavity 20. This is illustrated with the aid of second semi-reflecting mirror 24 in its original position, which is represented with the aid of dashed lines.

Figure 4:
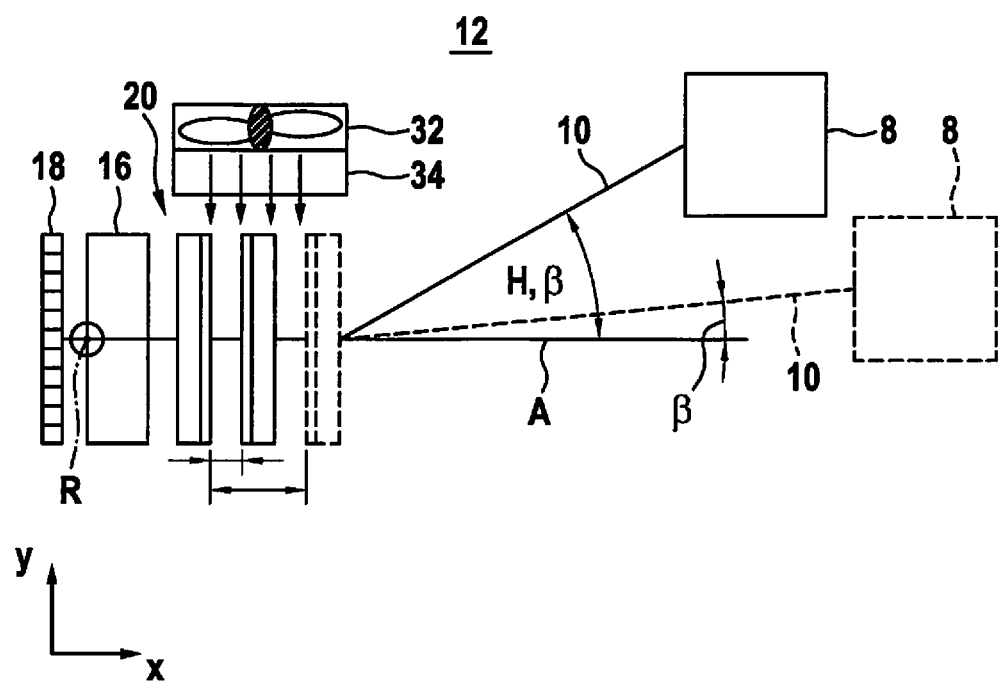
FIG. 4 shows a schematic representation of the receiving unit of the LIDAR device according to a third exemplary embodiment.

In FIG. 4, a schematic representation of receiving unit 12 of LIDAR device 1 according to a third exemplary embodiment is represented. In addition to the second exemplary embodiment, receiving unit 12 includes a fan 32, which may cool Fabry-Pérot cavity 20. Moreover, a heating element 34 for heating the air flow generated by fan 32 is installed downstream from fan 32. The arrows illustrate the air flow generated by fan 32. In particular, a temperature of semi-reflecting mirrors 22, 24 is adjusted with the aid of an air flow acted upon by a temperature. Additionally, the air or a fluid between semi-reflecting mirrors 22, 24 may be acted upon by the temperature of the air flow. As a result, a density of the fluid or of semi-reflecting mirrors 22, 24 is adapted. Since a refractive index of the components of Fabry-Pérot cavity 20 is dependent on density, the refractive index may be adapted by changing the temperature. Therefore, the transmission range of Fabry-Pérot cavity 20 may be adjusted or adapted to an incoming beam 10 by setting the temperature.

FIGS. 5a and 5b show a schematic representation of receiving unit 12 of LIDAR device 1 according to a fourth exemplary embodiment. In contrast to the above-mentioned exemplary embodiments, receiving unit 12 is rotatably mounted in its entirety, along rotational axis R and may be adjusted by an actuator (not shown) according to the deflection of mirror 6 and, therefore, according to an incidence angle β of incoming beam 10.

Figure 6:
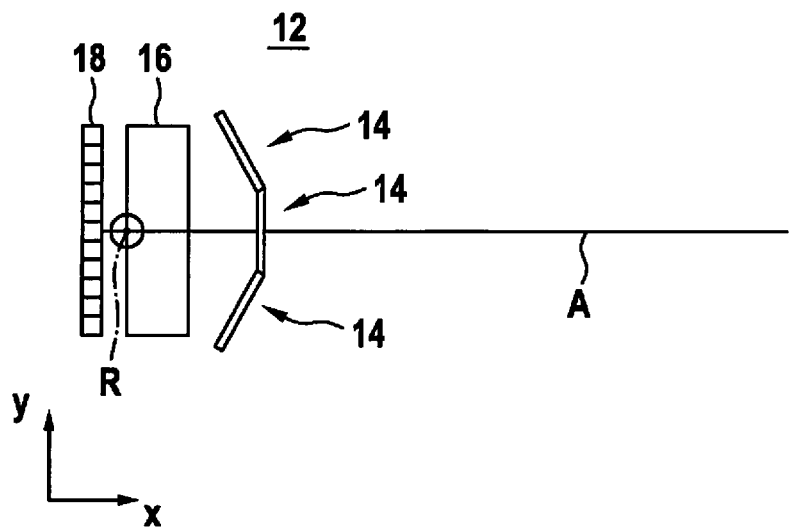
FIG. 6 shows a schematic representation of the receiving unit of the LIDAR device according to a fifth exemplary embodiment and FIG. 7 shows a schematic representation of the receiving unit of the LIDAR device according to a sixth exemplary embodiment.

In FIG. 6, a schematic representation of receiving unit 12 of LIDAR device 1 according to a fifth exemplary embodiment is represented. In contrast to the previous exemplary embodiments, receiving unit 12 includes three stationary filters 14. Filters 14 are situated at a relative angle with respect to one another. According to the exemplary embodiment, filters 14 are situated approximately semicircularly having rotational axis R as a center point. As a result, incoming beams 10 have a small relative incidence angle β with respect to particular filter 14. In this case, incoming beams 10 impact a filter 14, which is angled with respect to optical axis A, at a large incidence angle β in relation to optical axis A.

Figure 7:
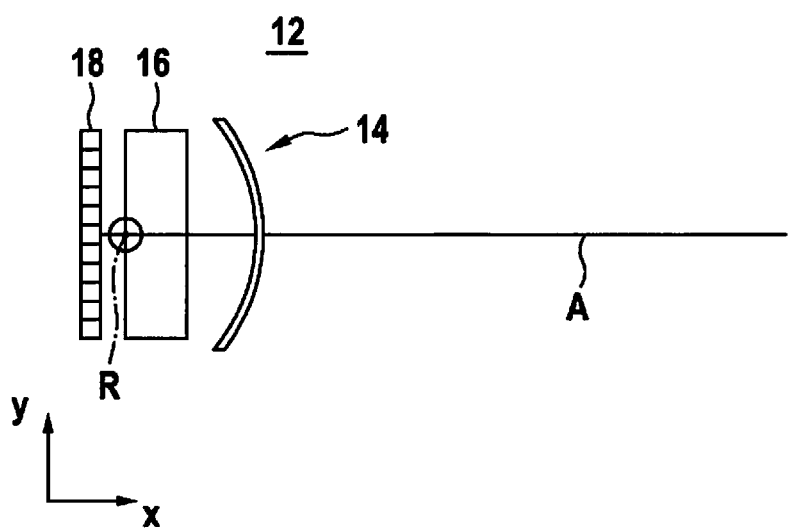

In FIG. 7, a schematic representation of receiving unit 12 of LIDAR device 1 according to a sixth exemplary embodiment is represented. In contrast to the fifth exemplary embodiment, receiving unit 12 includes a filter 14, which has a curvature. Filter 14 is configured as one piece and has a curvature in such a way that incoming beams 10 have a relative incidence angle β of 0° in relation to filter 14.

What is claimed is:

1. A LIDAR device for scanning a scanning angle, comprising:
   at least one radiation source to generate at least one electromagnetic beam, which is a generated beam having a wavelength in a non-visible infrared range;
   a rotatable mirror to deflect the at least one electromagnetic beam along the scanning angle;
   a receiving unit to receive at least one incoming electromagnetic beam and to deflect the at least one incoming electromagnetic beam to at least one detector; and
   at least one filter, of the receiving unit, adaptable to the at least one incoming electromagnetic beam;
   wherein the rotatable mirror is configured to deflect the generated beam along a defined horizontal scanning angle, wherein the rotatable mirror is swivel-able along a rotational axis and orthogonally with respect to the horizontal scanning angle (H) so as to cover a vertical scanning angle (V), so as to scan a solid angle (V×H) for locating an object positioned in the solid angle (V×H), and
   wherein the rotational axis extends orthogonally through an x-y plane of the receiving unit, wherein an incidence angle of the incoming beam includes a component of the horizontal scanning angle (H) and a component of the vertical scanning angle (V), wherein the at least one, filter is rotatably mounted and is rotated synchronously with the rotatable mirror or is periodically swiveled along another rotational axis, which extends in parallel to the rotational axis, for scanning in the horizontal scanning angle (H), wherein the filter is adjusted so that the incoming beam can impact perpendicularly the filter, wherein the filter does not have an adaptation of its angle when the object is situated frontally or slightly offset with respect to an optical axis, and wherein when the object is located farther from the optical axis, the incoming beam has a greater incidence angle, wherein since the filter is swiveled synchronously with the mirror, the incidence angle is greater in relation to the optical axis, but the incidence angle in relation to the adjusted filter is 0°, so that the incoming beam can transmit through the filter and enter the receiving unit.

2. The LIDAR device of claim 1, wherein the at least one filter is rotatable along the scanning angle.

3. The LIDAR device of claim 1, wherein the at least one filter is rotatable in relation to the rotatable mirror in an angularly offset or angularly synchronous manner.

4. The LIDAR device of claim 1, wherein the at least one filter is an adjustable Fabry-Pérot cavity, including semi-reflecting mirrors, each of the semi-reflecting mirrors includes a glass substrate and a semi-reflecting coating, wherein one of the semi-reflecting mirrors is stationary and cannot be displaced, and wherein one of the semi-reflecting mirror is situated so as to be displaceable.

5. The LIDAR device of claim 4, wherein the at least one filter has an adjustable cavity length, which is provided by displacing one of the semi-reflecting mirrors, so that a cavity length or a distance between the semi-reflecting mirrors can be changed.

6. The LIDAR device of claim 4, wherein the cavity length is adjustable depending on an orientation of the rotatable mirror.

7. The LIDAR device of claim 1, wherein the at least one filter has an adjustable refraction index.

8. The LIDAR device of claim 1, wherein the refraction index is adjustable depending on the orientation of the rotatable mirror.

9. The LIDAR device of claim 1, wherein at least two filters for filtering the at least one incoming electromagnetic beam are situatable with angular offset with respect to one another.

10. The LIDAR device of claim 1, wherein the at least one filter for filtering the at least one incoming electromagnetic beam has a curvature.

11. A method for scanning a scanning angle with a LIDAR device, the method comprising:
    generating, via at least one radiation source, at least one electromagnetic beam, which is a generated beam having a wavelength in a non-visible infrared range;
    deflecting, via a rotatable mirror, the at least one electromagnetic beam along the scanning angle;
    receiving and filtering, via a receiving unit and at least one filter, at least one incoming beam reflected on an object; and
    detecting the at least one reflected incoming beam;
    wherein at least one filter is adapted according to a wavelength and/or an incidence angle of the at least one incoming beam, and
    wherein the LIDAR device includes:
      the at least one radiation source to generate the at least one electromagnetic beam;
      the rotatable mirror to deflect the at least one electromagnetic beam along the scanning angle;
      the receiving unit to receive the at least one incoming electromagnetic beam and to deflect the at least one incoming electromagnetic beam to at least one detector; and
    the at least one filter adaptable to the at least one incoming electromagnetic beam;
    wherein the rotatable mirror is configured to deflect the generated beam along a defined horizontal scanning angle, wherein the rotatable mirror is swivel-able along a rotational axis and orthogonally with respect to the horizontal scanning angle (H) so as to cover a vertical scanning angle (V), so as to scan a solid angle (V×H) for locating an object positioned in the solid angle (V×H), and
    wherein the rotational axis extends orthogonally through an x-y plane of the receiving unit, wherein an incidence angle of the incoming beam includes a component of the horizontal scanning angle (H) and a component of the vertical scanning angle (V), wherein the at least one, filter is rotatably mounted and is rotated synchronously with the rotatable mirror or is periodically swiveled along another rotational axis, which extends in parallel to the rotational axis, for scanning in the horizontal scanning angle (H), wherein the filter is adjusted so that the incoming beam can impact perpendicularly the filter, wherein the filter does not have an adaptation of its angle when the object is situated frontally or slightly offset with respect to an optical axis, and wherein when the object is located farther from the optical axis, the incoming beam has a greater incidence angle, wherein since the filter is swiveled synchronously with the mirror, the incidence angle is greater in relation to the optical axis, but the incidence angle in relation to the adjusted filter is 0°, so that the incoming beam can transmit through the filter and enter the receiving unit.

* * * * *